US009361884B2

(12) United States Patent
Gandrabur et al.

(10) Patent No.: US 9,361,884 B2
(45) Date of Patent: Jun. 7, 2016

(54) COMMUNICATING CONTEXT ACROSS DIFFERENT COMPONENTS OF MULTI-MODAL DIALOG APPLICATIONS

(71) Applicant: Nuance Communications, Inc., Burlington, MA (US)

(72) Inventors: Simona Gandrabur, Verdun (CA); Eric Buist, Montreal (CA); Matthieu Hebert, Melocheville (CA)

(73) Assignee: Nuance Communications, Inc., Burlington, MA (US)

( * ) Notice: Subject to any disclaimer, the term of this patent is extended or adjusted under 35 U.S.C. 154(b) by 204 days.

(21) Appl. No.: 13/793,822

(22) Filed: Mar. 11, 2013

(65) Prior Publication Data

US 2014/0257793 A1 Sep. 11, 2014

(51) Int. Cl.
*G06F 17/27* (2006.01)
*G10L 15/22* (2006.01)
*G06N 5/04* (2006.01)

(52) U.S. Cl.
CPC ............... *G10L 15/22* (2013.01); *G06F 17/27* (2013.01); *G06F 17/2785* (2013.01); *G06N 5/04* (2013.01); *G06F 17/274* (2013.01); *G10L 2015/228* (2013.01)

(58) Field of Classification Search
USPC .......................... 704/2, 3, 4, 9, 10, 231, 232
See application file for complete search history.

(56) References Cited

U.S. PATENT DOCUMENTS

| 6,963,831 | B1 | 11/2005 | Epstein |
| 7,092,928 | B1 | 8/2006 | Elad et al. |
| 2002/0042707 | A1* | 4/2002 | Zhao et al. ........................ 704/9 |
| 2002/0123891 | A1 | 9/2002 | Epstein |
| 2005/0049852 | A1* | 3/2005 | Chao .................................. 704/9 |
| 2008/0208586 | A1* | 8/2008 | Ativanichayaphong et al. ........................... 704/270.1 |
| 2010/0030723 | A1* | 2/2010 | Au .................................... 706/55 |
| 2010/0114944 | A1 | 5/2010 | Adler et al. |
| 2011/0112921 | A1 | 5/2011 | Kennewick et al. |
| 2011/0258543 | A1* | 10/2011 | Larsson et al. ................. 715/702 |
| 2013/0006623 | A1* | 1/2013 | Chelba et al. ................. 704/233 |

(Continued)

FOREIGN PATENT DOCUMENTS

WO 0021074 A1 4/2000

OTHER PUBLICATIONS

Statement RE: Related Applications, dated Jul. 21, 2015.

(Continued)

*Primary Examiner* — Vu B Hang
(74) *Attorney, Agent, or Firm* — Banner & Witcoff, Ltd.

(57) ABSTRACT

A human-machine dialog system is described which has multiple computer-implemented dialog components. A user client delivers output prompts to a human user and receives dialog inputs including speech inputs from the human user. An automatic speech recognition (ASR) engine processes the speech inputs to determine corresponding sequences of representative text words. A natural language understanding (NLU) engine processes the text words to determine corresponding semantic interpretations. A dialog manager (DM) generates the output prompts and responds to the semantic interpretations so as to manage a dialog process with the human user. The dialog components share context information with each other using a common context sharing mechanism such that the operation of each dialog component reflects available context information.

20 Claims, 7 Drawing Sheets

(56) References Cited

U.S. PATENT DOCUMENTS

2013/0086029 A1    4/2013   Hebert
2013/0152092 A1    6/2013   Yadgar

OTHER PUBLICATIONS

Non-Final Office Action dated Feb. 18, 2015, issued in U.S. Appl. No. 13/793,805.
Amendment filed May 18, 2015, in U.S. Appl.No. 13/793,805.
Non-Final Office Action dated Dec. 18, 2014, issued in U.S. Appl. No. 13/793,854.
Amendment filed Mar. 18, 2015, in U.S. Appl. No. 13/793,854.
Final Office Action dated Jun. 18, 2015, issued in U.S. Appl. No. 13/793,854.
International Search Report and Written Opinion for International App. No. PCT/US2015/037318, dated Oct. 19, 2015.
Amendment filed Oct. 5, 2015, in U.S. Appl. No. 13/793,854.

* cited by examiner

Fig. 7 ns share context information with each other using a common context sharing mechanism such that the operation of each dialogue component reflects available context information.

COMMUNICATING CONTEXT ACROSS DIFFERENT COMPONENTS OF MULTI-MODAL DIALOG APPLICATIONS

FIELD OF THE INVENTION

The present invention relates to natural language processing applications, and more specifically, to identifying and resolving anaphora that occur in conversational dialogue applications.

BACKGROUND ART

Natural Language Processing (NLP) and Natural Language Understanding (NLU) involve using computer processing to extract meaningful information from natural language inputs such as human generated speech and text. One recent application of such technology is processing speech and/or text queries in multi-modal conversational dialog applications such as for mobile devices like smartphones.

Figure 1:
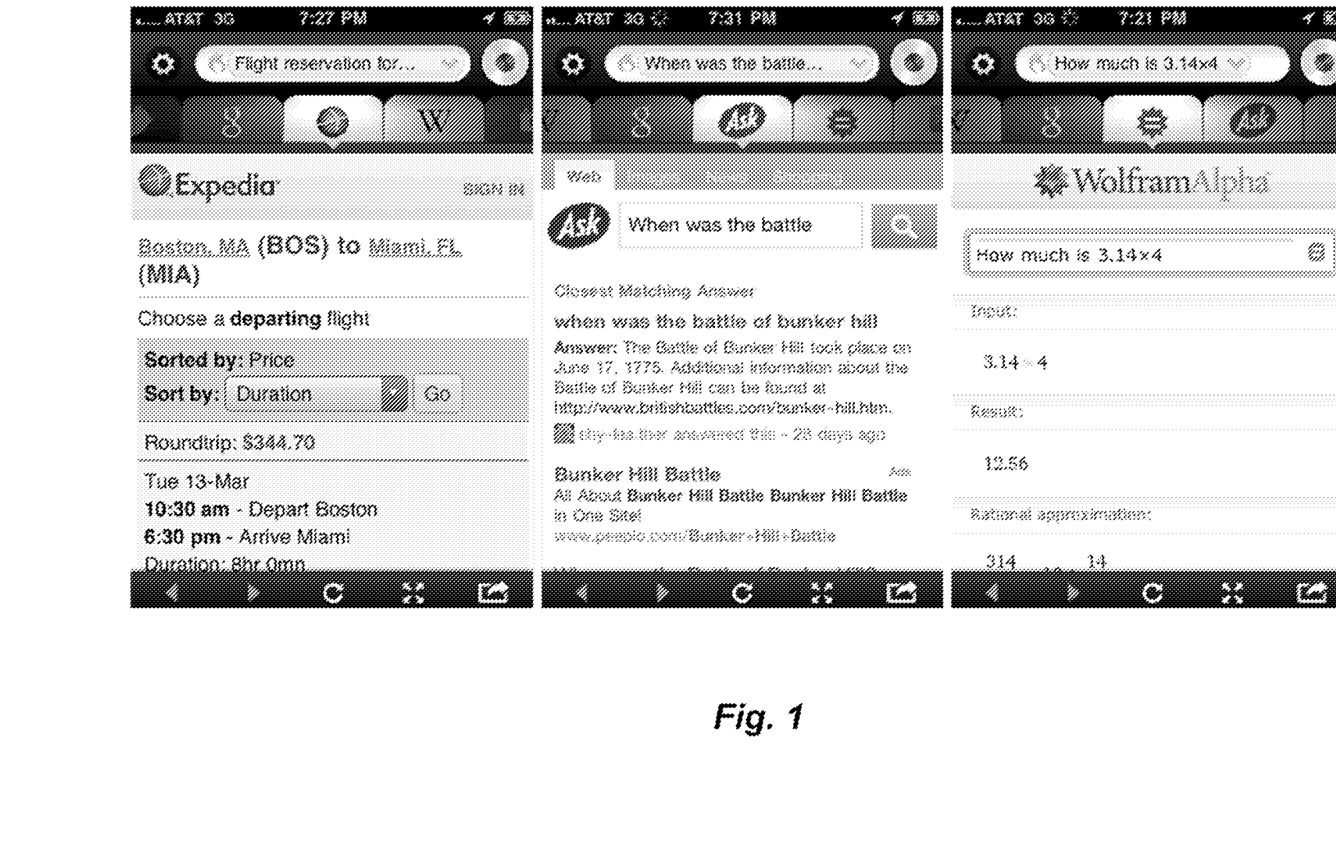
FIG. 1 shows some example screen shots of a conversational dialog application for a mobile device.

FIG. 1 shows some example screen shots of one such conversational dialogue application for a mobile device, Dragon Go!, which processes speech query inputs and obtains simultaneous search results from a variety of top websites and content sources. Such conversational dialogue applications require adding a natural language understanding component to an existing web search algorithm in order to extract semantic meaning from the input queries. This can involve using approximate string matching to discover semantic template structures. One or more semantic meanings can be assigned to each semantic template. Parsing rules and classifier training samples can be generated and used to train NLU models that determine query interpretations (sometimes referred to as query intents).

In a typical conversational dialog application, there are several interconnected components:
   the dialogue manager (DM) which decides what the next action should be after each user input,
   the automatic speech recognition engine (ASR) which translates spoken utterances into sequences of text words
   the natural language understanding engine (NLU) which maps the words into semantic interpretations, or concepts, and
   the client, typically the component which resides on a mobile device or embedded platform and deals with visual displays and touch input.

SUMMARY OF THE INVENTION

Embodiments of the present invention are directed to a human-machine dialogue arrangement with multiple computer-implemented dialogue components to communicate and use context between the components, thereby helping to narrow down understanding, recognition and reasoning errors. A user client delivers output prompts to a human user and receives dialogue inputs including speech inputs from the human user. An automatic speech recognition (ASR) engine processes the speech inputs to determine corresponding sequences of representative text words. A natural language understanding (NLU) engine processes the text words to determine corresponding semantic interpretations. A dialogue manager (DM) generates the output prompts and responds to the semantic interpretations so as to manage a dialogue process with the human user. The dialogue components share context information with each other using a com- The context sharing mechanism specifically may be based on key value pairs including a key element characterizing a specific context type and a value element characterizing a specific context value. The context information may include dialog context information reflecting context of the dialogue manager within the dialogue process. In such a case, the dialogue context information may include one or more of:
   a belief state reflecting collective knowledge accumulated during the dialogue process,
   an expectation agenda reflecting new information expected by the dialogue manager,
   a dialogue focus reflecting information most recently prompted by the dialogue manager, and
   one or more selected items reflecting user dialogue choices needed by the dialogue manager.
The context information also may include client context information reflecting context of the user client within the dialogue process and/or NLU context information reflecting context of the NLU engine within the dialogue process.

Embodiments of the present invention also are directed to a human-machine dialogue arrangement with multiple computer-implemented dialogue components that performs a semantic re-ranking of NLU results in conversational applications using dialogue context and world knowledge. A user client delivers output prompts to a human user and receives dialogue inputs from the human user including speech inputs. An automatic speech recognition (ASR) engine processes the speech inputs to determine corresponding sequences of representative text words. A natural language understanding (NLU) engine processes the text words to determine corresponding NLU-ranked semantic interpretations. A semantic re-ranking module re-ranks the NLU-ranked semantic interpretations based on at least one of dialog context information and world knowledge information. A dialogue manager responds to the re-ranked semantic interpretations and generates the output prompts so as to manage a dialogue process with the human user.

The semantic re-ranking module may re-rank the NLU-ranked semantic interpretations using dialog context information characterized by a context sharing mechanism using key value pairs including a key element characterizing a specific context type and a value element characterizing a specific context value. In addition or alternatively, the semantic re-ranking module may re-rank the NLU-ranked semantic interpretations using dialogue context information including one or more of: a belief state reflecting collective knowledge accumulated during the dialogue process, an expectation agenda reflecting new information expected by the dialogue manager, a dialogue focus reflecting information most recently prompted by the dialogue manager, and one or more selected items reflecting user dialogue choices needed by the dialogue manager.

In specific embodiments, the semantic re-ranking module may re-rank the NLU-ranked semantic interpretations using dialog context information that includes NLU context information reflecting context of the NLU engine within the dialogue process. The semantic re-ranking module also may re-rank the NLU-ranked semantic interpretations using semantic feature confidence scoring. For example, the semantic feature confidence scoring may be combined in a decision tree to re-rank the NLU-ranked semantic interpretations.

Embodiments of the present invention also are directed to an automatic conversational system having multiple computer-implemented dialogue components for conducting an automated dialogue process with a human user, which detects and resolves anaphora based on linguistic cues, dialogue context and general knowledge. A user client delivers dialogue output prompts to the human user and receives dialogue input responses from the human user including speech inputs. An automatic speech recognition engine processes the speech inputs to determine corresponding sequences of representative text words. A natural language understanding (NLU) processing arrangement processes the dialogue input responses and the text words to determine corresponding semantic interpretations. The NLU processing arrangement includes an anaphora processor that accesses different information sources characterizing dialogue context, linguistic features, and NLU features to identify unresolved anaphora in the text words needing resolution in order to determine a semantic interpretation. A dialogue manager manages the dialogue process with the human user based on the semantic interpretations.

The anaphora processor may further resolve an identified unresolved anaphora by associating it with a previous concept occurring in the text words. For example, the anaphora processor may favor recent actions in the dialogue process, use one or more dialogue scope rules, semantic distance relations, semantic coherence relations and/or concept default values to resolve an identified unresolved anaphora.

The system may use a client-server architecture, for example, where the user client resides on a mobile device.

DETAILED DESCRIPTION OF SPECIFIC EMBODIMENTS

Dialogue Context Sharing

In traditional conversational dialog applications, all of the components function in a context-less mode: each user input is recognized and understood in isolation, and deciding what the next step should be is done by taking into account only the current state of a given component and the last user input. But human reasoning and natural language understanding rely heavily on using dialogue context information such as conversation history, visual cues, user profile, world knowledge, etc. Embodiments of the present invention are directed to a conversational dialogue arrangement which allows the various system components to keep track of dialogue context and share such information with other system components.

Figure 2:
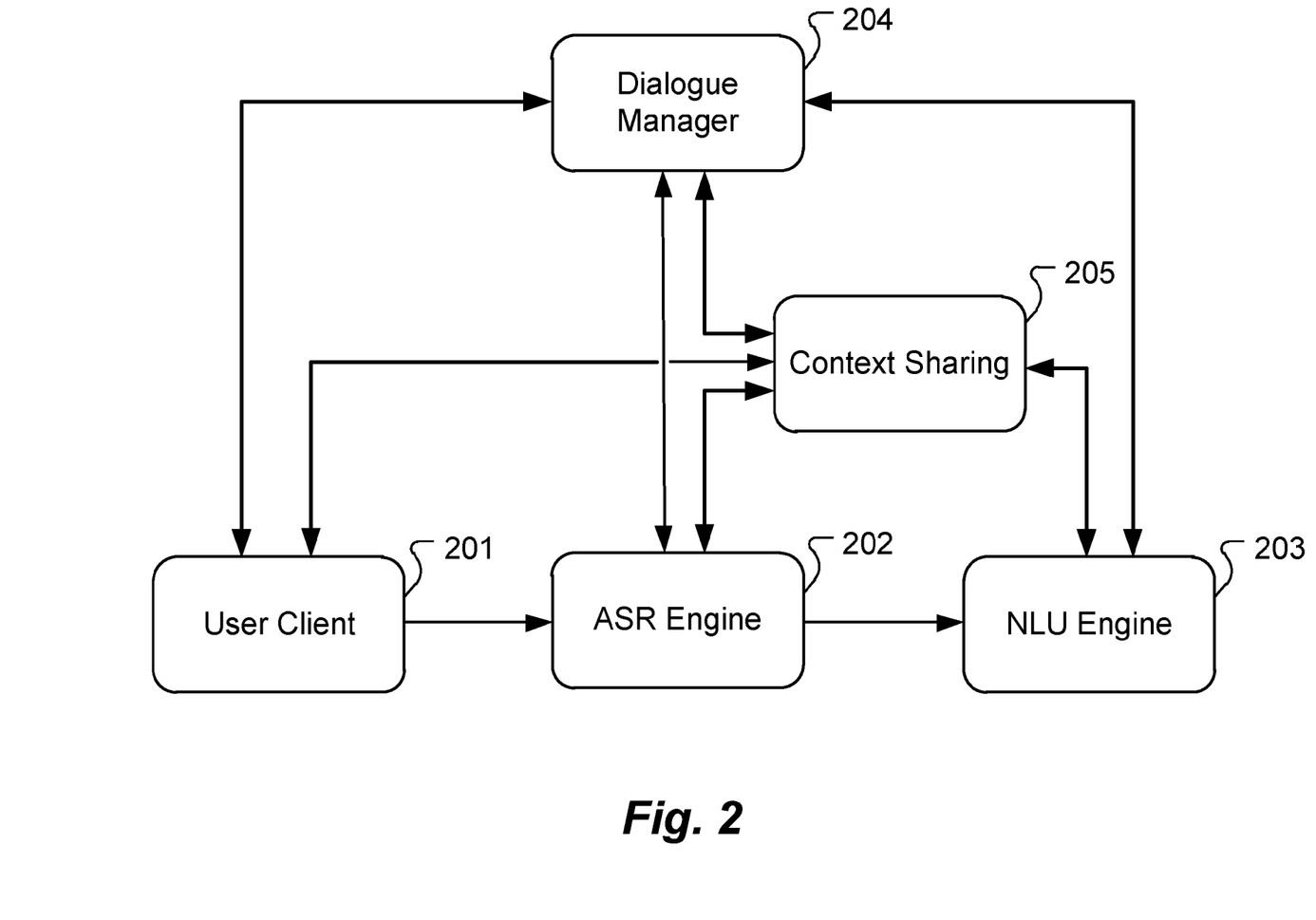
FIG. 2 shows an example of a multi-modal conversational dialog application arrangement that shares context information between the components according to an embodiment of the present invention.
Figure 3:
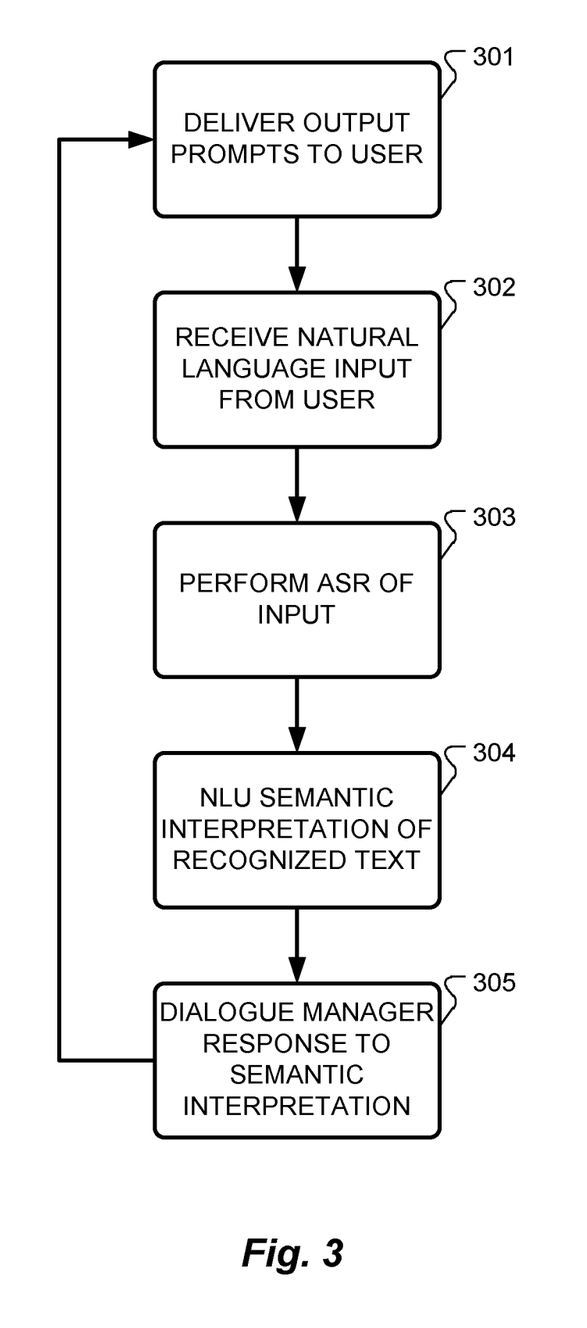
FIG. 3 is a flowchart showing various functional steps in a context-sharing conversational dialog application according to an embodiment of the present invention.

FIG. 2 shows an example of a conversational dialogue system and FIG. 3 is a flowchart showing various functional steps in a conversational dialog application that shares context information between the components according to an embodiment of the present invention. A user client 201 delivers output prompts to a human user, step 301, and receives natural language dialogue inputs including speech inputs from the human user, step 302. An automatic speech recognition (ASR) engine 202 processes the speech inputs to determine corresponding sequences of representative text words, step 303. A natural language understanding (NLU) engine 203 processes the text words to determine corresponding semantic interpretations, step 304. A dialogue manager (DM) 204 generates the output prompts and responds to the semantic interpretations so as to manage a dialogue process with the human user, step 305. Context sharing module 205 provides a common context sharing mechanism so that each of the dialogue components—user client 201, ASR engine 202, NLU engine 203, and dialogue manager 204—share context information with each other so that the operation of each dialogue component reflects available context information.

For example, the context sharing module 205 can manage dialogue context information of the dialogue manager 204 based on maintaining a dialogue belief state that represents the collective knowledge accumulated from the user input throughout the dialogue. An expectation agenda represents what new pieces of information the dialogue manager 204 still expects to collect at any given point in the dialogue process. The dialogue focus represents what specific information the dialogue manager 204 just explicitly requested from the user, and similarly the dialogue manager 204 would also track the currently selected items, which typically are candidate values among which the user needs to choose for disambiguation, for selecting a given specific option (one itinerary, one reservation hour, etc.), and for choosing one of multiple possible next actions ("book now", "modify reservation", "cancel", etc.).

Based on such an approach, a dialogue context protocol can be defined:

BELIEF=list of pairs of concepts (key, values) collected throughout the dialogue where the key is a name that identifies a specific kind of concept and the values are the corresponding concept values. For example "I want to book a meeting on May first" would yield a BELIEF={(DATE,"2012/05/01"), INTENTION="new_meeting")}.

FOCUS=the concept key. For example, following a question of the system "What time would you like the meeting at?", the focus will be START_TIME, EXPECTATION=list of concepts keys the system can expect to receive. For instance, in the example above, while FOCUS is START_TIME, EXPECTATION can contain DURATION, END_TIME, PARTICIPANTS, LOCATION, . . . .

SELECTED_ITEMS: a list of key-value pairs of currently selected concept candidates among which the user needs to pick. Thus a dialogue prompt: "do you mean Debbie Sanders or Debbie Xanders?" would yield to SELECTED_ITEMS {(CONTACT, Debbie Sanders), (CONTACT, Debbie Xanders)}

Communicating this dialogue context information back to the NLU engine 203 enables the NLU engine 203 to weight focus and expectation concepts more heavily. And communicating such dialogue context information back to the ASR engine 202 can allow for smart dynamic optimization of the recognition vocabulary, and communicating the dialogue context information back to the user client 201 can help determine part of the current visual display on that device.

Similarly, the context sharing module 205 also can manage visual/client context information of the user client 201. One specific example of visual context would be when the user looks at a specific day of her calendar application on the visual display of the user client 201 and says: "Book a meeting at 1 pm", she probably means to book it for the date currently in view in the calendar application.

The user client 201 also can communicate touch input information via the context sharing module 205 to the dialogue manager 204 by sending the semantic interpretations corresponding to the equivalent natural language command. For instance, clicking on a link to "Book now" can translate into INTENTION:confirmBooking. In addition, the user client 201 can send contextual information by prefixing each such semantic key-value input pairs by the keyword CONTEXT. In that case, the dialogue manager 204 will treat this information as "contextual" and consider it for default values, but not as explicit user input.

The context sharing module 205 also manages NLU/general knowledge context with regards to the NLU engine 203. For example, when a person says: "Book a flight to London," it is safe to assume that the destination is not London, Ontario, that the user most probably means London, UK. Moreover, depending on the user's current location and/or other information in a user profile, it might even be reasonable to propose what specific London airport is most likely. The NLU engine 203 can access knowledge databases and return contextual information about concepts that have not been explicitly mentioned in the user's current sentence, and can communicate context by defining complex hierarchical concepts and concept properties (or attributes) associated to a concept.

Semantic Re-Ranking

Conventional ASR and NLU engines process natural language user inputs in isolation, one input at a time. Each engine typically produces a set of output candidates. Each ASR candidate can have multiple semantic interpretations—language is ambiguous and a given sequence of words can mean many different things. A semantic interpretation can be thought of as a set of (possibly hierarchical) semantic slots, each corresponding to a concept in the natural language input. The ASR recognition candidates are ranked in terms of acoustic and language model match. In the special case of a natural language input from the user in the form of text from a keyboard, the ASR engine can be bypassed, which is equivalent to a 1-best high accuracy ASR output. The ASR and NLU semantic interpretations typically are ranked by various heuristics ranging from parsing accuracy to semantic model probabilities.

But both the ASR engine and the NLU engine have no notion of conversation history. Their combined semantic interpretation candidates are ranked based on local features only. However, sometimes, knowing what question was asked in the dialogue process (the focus), what information is already known (the belief state), and what other pieces of information can be still expected from the user (the expectation agenda) can influence the likelihood of one interpretation candidate over another. Moreover, having some notion of world knowledge could help make a better informed decision of which of the interpretation candidates is actually correct; for example, knowing that the scheduling of a 13 minute meeting is much less probable than the scheduling of a 30 minute meeting.

This suggests that it would be useful to perform a re-ranking of the N-best semantic interpretations using dialogue context and world knowledge to order all likely interpretations of an utterance by their adequacy in representing the user intent. Thus, embodiments of the present invention also are directed to a human-machine dialogue arrangement with multiple computer-implemented dialogue components that performs a semantic re-ranking of NLU results in conversational applications using dialogue context and world knowledge.

Figure 4:
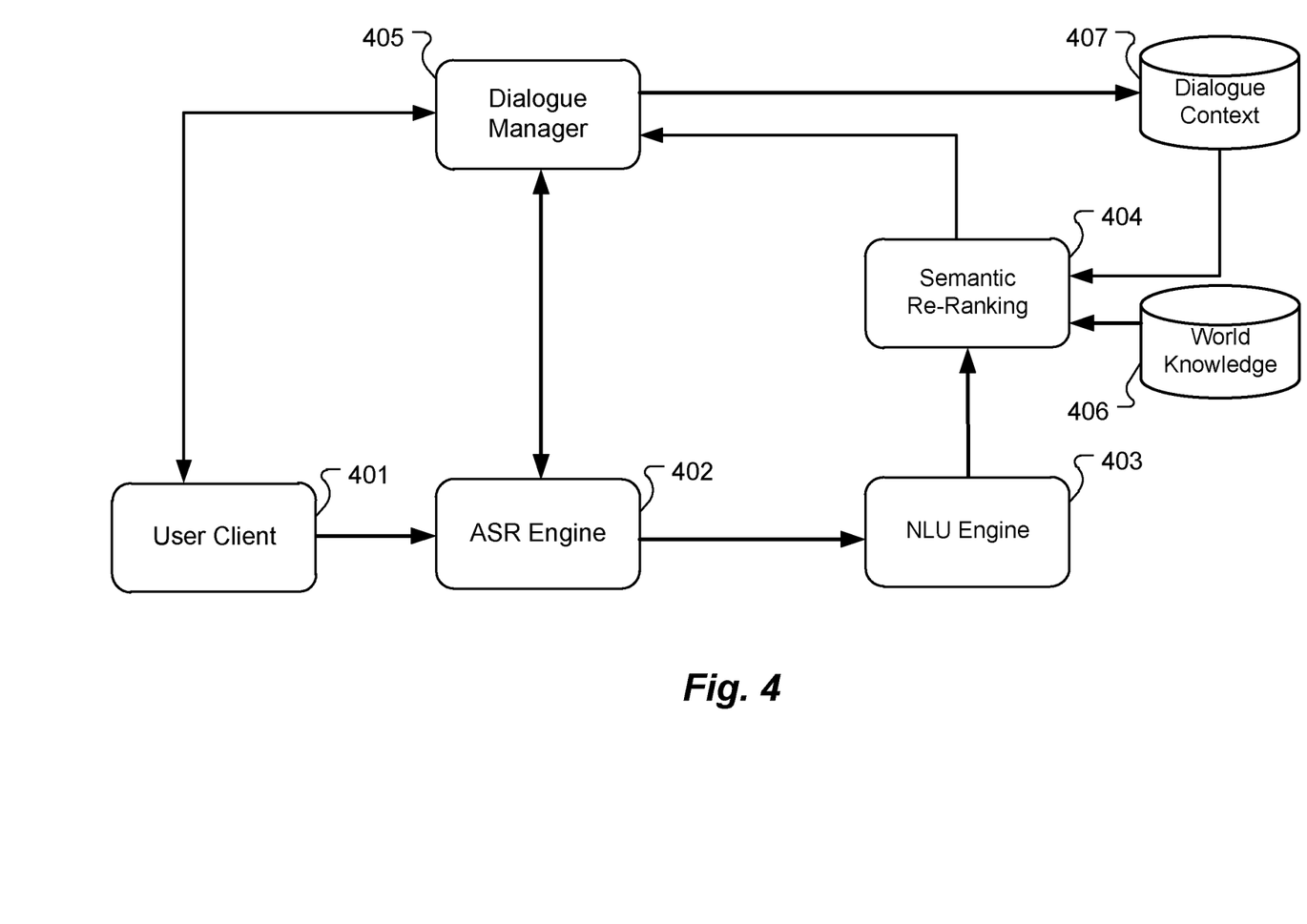
FIG. 4 shows an example of an automated conversational dialogue system that performs a semantic re-ranking of NLU results using dialogue context and world knowledge according to an embodiment of the present invention.
Figure 5:
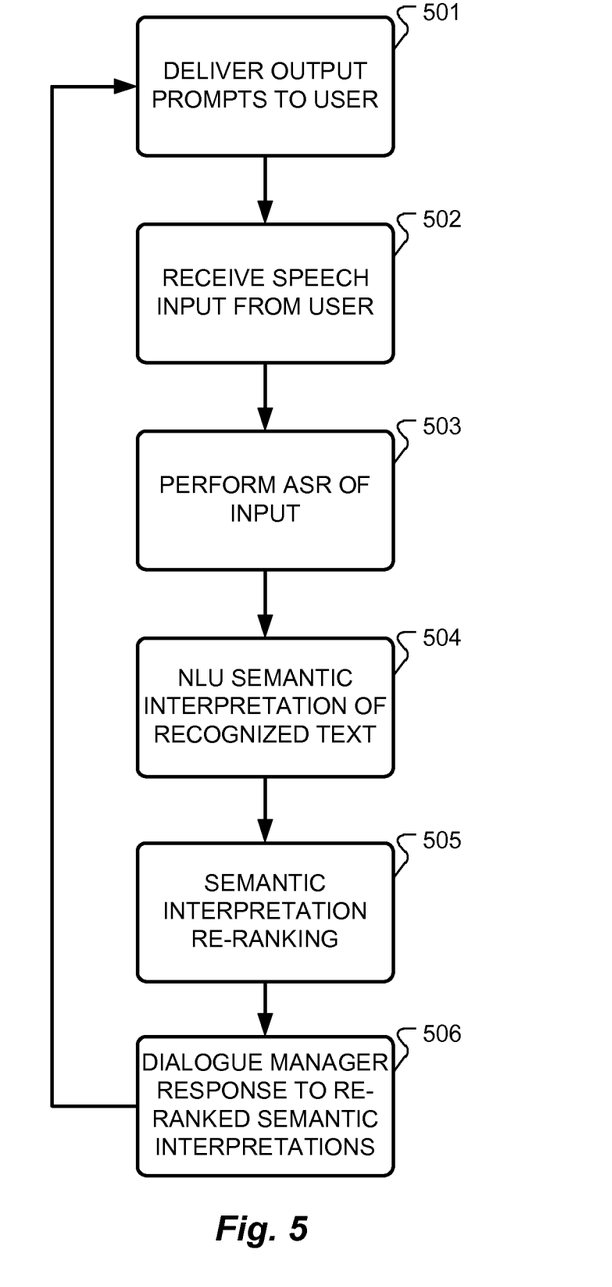
FIG. 5 is a flowchart showing various functional steps in an automated conversational dialog application performs a semantic re-ranking of NLU results using dialogue context and world knowledge according to an embodiment of the present invention.

FIG. 4 shows an example of an automated conversational dialogue system and FIG. 5 is a flowchart showing various functional steps in an automated conversational dialogue application performs a semantic re-ranking of NLU results using dialogue context and world knowledge according to an embodiment of the present invention. A user client 401 delivers output prompts to a human user, step 501, and receives dialogue inputs from the human user including speech inputs, step 502. An automatic speech recognition (ASR) engine 402 processes the speech inputs to determine corresponding sequences of representative text words, step 503. A natural language understanding (NLU) engine 403 processes the text words to determine corresponding NLU-ranked semantic interpretations, step 504. A semantic re-ranking module 404 re-ranks the NLU-ranked semantic interpretations based on at least one of dialogue context information 407 and world knowledge information 408, step 505. A dialogue manager 405 responds to the re-ranked semantic interpretations and generates the output prompts so as to manage a dialogue process with the human user, step 506.

The semantic re-ranking module 404 may re-rank the N-best NLU-ranked semantic interpretations. Dialogue context information 407 can be characterized by a context sharing mechanism using key value pairs including a key element characterizing a specific context type and a value element characterizing a specific context value, thereby reflecting context of the NLU engine within the dialogue process. In a specific embodiment, the dialogue context information 407 may include one or more of:

- a belief state reflecting collective knowledge accumulated during the dialogue process,
- an expectation agenda reflecting new information expected by the dialogue manager 405,
- a dialogue focus reflecting information most recently prompted by the dialogue manager 405, and
- one or more selected items reflecting user dialogue choices needed by the dialogue manager 405.

Conventional approaches to semantic re-ranking are based on a pipeline of ad hoc rules. The tuning of those rules for specific applications can be very difficult since the impacts of modifying a rule are difficult to predict and some rules seem more adapted to a given application than to another. Thus, in specific embodiments of the present invention the semantic re-ranking module 404 may use a machine learning approach to learn a statistical re-ranking model on annotated examples with the semantic slots that a 1-best output should contain. A default re-ranking model can be included with the semantic re-ranking module 404 but an application developer also can produce a custom or adapted model using an offline training tool. The application developer also may define rules that would have precedence on the statistical re-ranking model to fix specific cases.

In a specific embodiment, for each semantic interpretation returned by the NLU engine, a set of robust, application independent and language independent confidence features can be computed including, for example:

- Internalization status: Categorizing the relevancy of the semantic interpretation to the application domain. Interpretations that are out of vocabulary or not matching are filtered.
- Parsing confidence: Confidence of the NLU in the interpretation parsing.
- Focus weight: Categorizing the interpretation on how well it fits the expectation of the application.
- Parsed word ratio: The ratio of words attributed to a semantic slot in the utterance.
- Slot internalization ratio: The ratio of slots relevant to the dialog application in the current context.
- Internalized word ratio: The ratio of words attributed to a semantic slot relevant to the dialog application in the current context.
- Raw Score: Score attributed to the ASR result on which the interpretation is based.
- ASR index: Position of the ASR result on which the interpretation is based in the list of all ASR results
- Slot in focus count: Number of slots in the interpretation that are expected by the dialog application.
- Parsing score: Score attributed by the NLU ranker to the interpretation.
- Average prior: Average of the semantic slot prior value.
- Correction Score: Ratio of corrected slots.
- Correction slot count: Number of slots that have been corrected.
- Slot count: The number of slots in the interpretation
- Ratio of slots in focus: Ratio of slots expected by the application.
- RAW score cluster: Cluster raw score in 5 groups based on their normalized value.
- Average interpretation similarity: The average similarity of the interpretation to other interpretations of the N-best list. The similarity between two different interpretations is measured by the F1-score. A good interpretation tends to be generated several times with some variation.

These can characterized by a multi-dimensional feature vector to which a polynomial transformation can be applied to produce a prediction target that reflects the adequacy of a given semantic interpretation based on its similarity to the annotation measured by the F1-score of their respective list of associated semantic slots.

Once the confidence feature criteria are included for each semantic interpretation, two types of re-ranking decisions can be implemented: confidence score computation and heuristic weighting. Heuristic weighting can be based on a neural net model that computes feature weights and process a weighted sum of the features. Confidence score features can be combined in a decision tree and a new ranking obtained of the semantic interpretations with the most likely one ranked first. Specifically, parsing of the decision tree in effect answers in a series of questions about the confidence features that are used to compute a confidence-based re-ranking score. At each node in the decision tree, a question about one feature or one combination of features is answered to produce a new semantic ranking score for the complete sentence. The re-ranked semantic interpretations are then returned to the dialogue manager.

Anaphora Resolution

A dialogue reference to a previously discussed concept is called an anaphora, and a sentence containing such references is called anaphoric. The mechanisms by which such references are solved is called anaphora resolution. For example, suppose a person is placing an order for pizza delivery, and at some points says "make it extra-large". One could assume that it refers to the pizza size. Yet it could also be the size of a drink and only the conversational context can help resolve this ambiguity. If the customer had said "make it all dressed", one would use the common world knowledge, knowing that only pizzas have the property of being all-dressed, to deduce that the sentence refers to pizza.

Embodiments of the present invention also are directed to a generic application-independent algorithm that allows automated conversational dialogue applications to detect and resolve anaphora based on linguistic cues, dialogue context and general knowledge.

Figure 6:
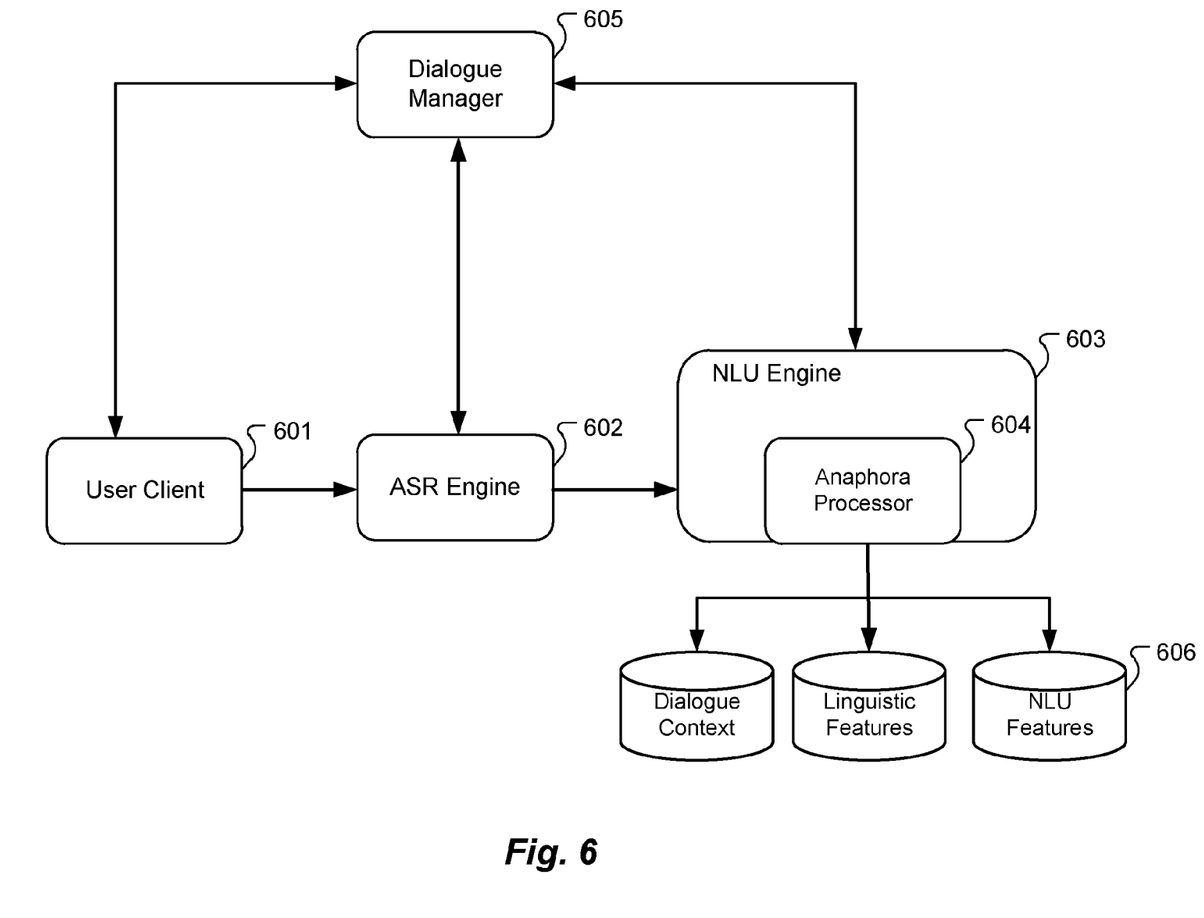
FIG. 6 shows an example of an automated conversational dialogue system that identifies and resolves anaphora according to an embodiment of the present invention
Figure 7:
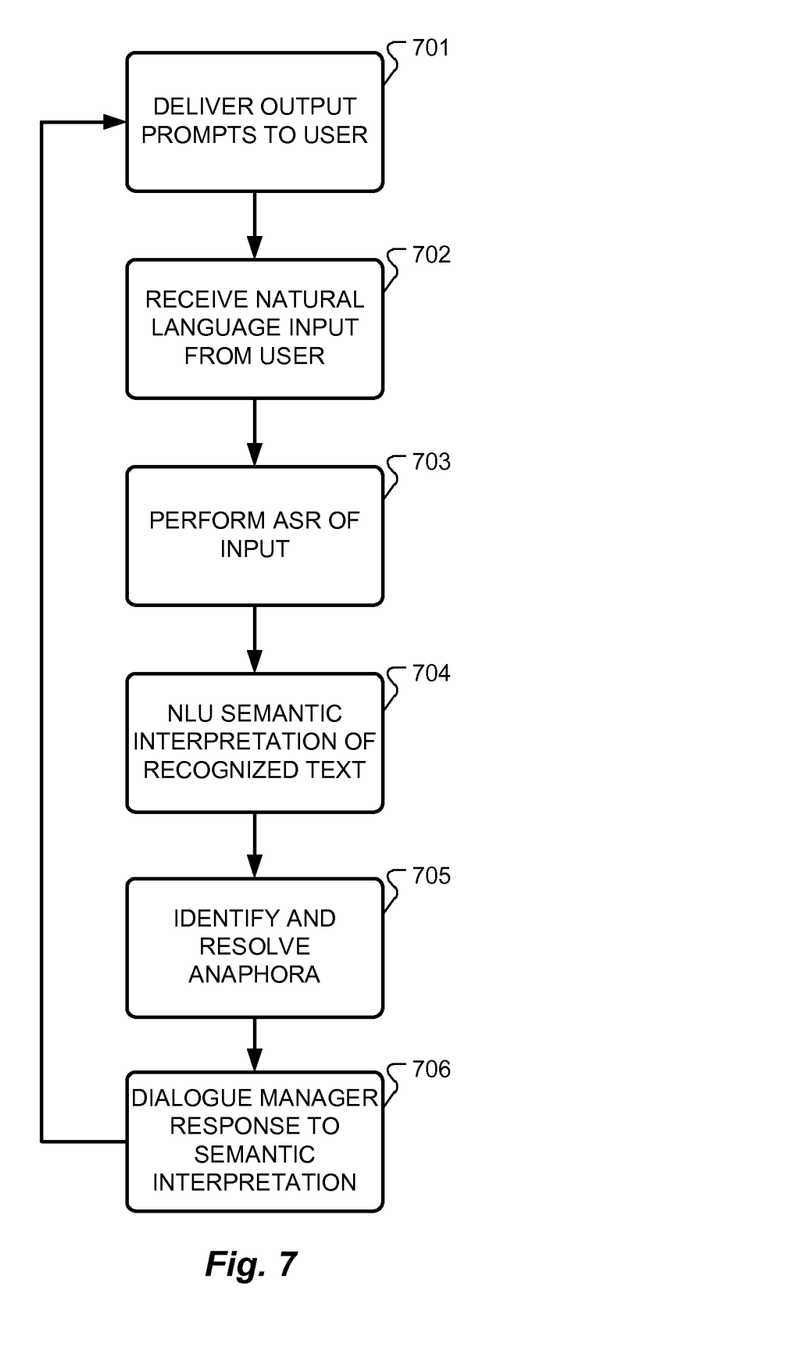
FIG. 7 is a flowchart showing various functional steps in an automated conversational dialog application that identifies and resolves anaphora according to an embodiment of the present invention.

FIG. 6 shows an example of an automated conversational dialogue system and FIG. 7 is a flowchart showing various functional steps in an automated conversational dialog application that identifies and resolves anaphora according to an embodiment of the present invention. A user client 601 delivers output prompts to a human user, step 701, and receives natural language dialogue inputs including speech inputs from the human user, step 702. An automatic speech recognition (ASR) engine 602 processes the speech inputs to determine corresponding sequences of representative text words, step 703. A natural language understanding (NLU) engine 603 processes the text words to determine corresponding semantic interpretations, step 704. The NLU engine 603 includes an anaphora processor 604 that accesses different information sources 606 characterizing dialogue context, linguistic features, and NLU features to identify and resolve anaphora in the text words needing resolution, step 705, in order to determine a semantic interpretation. A dialogue manager (DM) 605 generates the output prompts and responds to the semantic interpretations so as to manage a dialogue process with the human user, step 706.

Among the different information sources 606 accessed by the anaphora processor 604 to flag zero or more concepts as anaphoric are NLU features that reflect when the anaphora processor 604 learns that certain wordings project to concepts (slots) being carried over from context. For example, when a sentence starts with "how about . . . ", the previous user intent will apply to the current query, and so the anaphora processor 604 generates an INTENTION="context" concept. If a sentence contains a personal pronoun ("call her"), the person is somebody mentioned in the past conversation history and the anaphora processor 604 will generate a PERSON="context" concept. So, whenever the output of the NLU engine 603 contains concepts whose value is "context", this is a reliable indication that particular concept needs to be mapped by the anaphora processor 604 to a mention earlier in the conversation. The NLU predictions are meant to be more generic: "her" might refer to a MEETING_PARTICIPANT, yet the anaphora processor 604 will map it to PERSON: context. "It" could mean anything and the anaphora processor 604 will map that to CONCEPT:context.

The information sources 606 that the anaphora processor 604 accesses also include dialogue context data. Elliptic input queries are detected when slots that are mandatory at a given point in the dialogue are missing. For example, if the recognized sentence lacks a slot for INTENTION but there are other action parameters (date, time, person, etc.), that would be evidence of context carry-over. The information sources 606 also include linguistic features such as missing verbs ("How about tomorrow?"), elliptic sentences ("not that"), presence of pronouns ("with her"), presence of definite articles ("the pizza").

Any anaphora identified by the anaphora processor 604 also need to be resolved. The dialogue manager 605 keeps track of the dialogue history, recording each step in the dialogue (user input, system prompt) along with the set of current selected items (or search results) at each step and the current belief state (the collected values that define the query). At each new user input, the anaphora processor 604 iterates through the dialogue history, starting from the previous user query and working back towards further back interactions, and computes a correlation measure optimized over data examples. The anaphora processor 604 bases this correlation measure on various features such as:

- Dialogue history. For example, how far back in the conversation history are the "missing" concept slots being found?
- Dialogue scope/task configuration. Independent stand-alone tasks can be configured as boundaries for context carry-over. For example, given an application that can schedule meetings, make restaurant reservations, place calls, send emails, etc., some of these tasks could be marked as "incompatible" so that no carry over is allowed.
- Semantic/ontology distance. Typically there may be a hierarchy of "is a" relations in a given ontology (a MEETING_PARTICIPANT is a PERSON). When the NLU engine 603 outputs a context slot, the anaphora processor 604 looks in the dialogue history for any concept of the same type, or of a more general type, linked through a "is a" relation.
- Semantic/ontology coherence. The system can represent "has a" relations in the ontology ("PIZZA has a SIZE and PIZZA has a TOPPINGS_TYPE). In each anaphoric sentence, the anaphora processor 604 replaces the context concept with its resolution candidate and computes how "semantically compatible" the sentence is (a sentence "make the pizza all dressed" has a higher semantic coherence than "make the drink all dressed").
- Default values. Sometimes the anaphora processor 604 can resolve missing concepts not from the dialogue history, but from default values. Deciding when a concept has a default value and when it is probable enough or more probable than a matching value can be computed by the anaphora processor 604 as a combination of all of the above measures.

When the resolution probability is high enough (e.g., above a configurable threshold), the anaphora processor 604 accepts the resolution.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as preprogrammed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

A described "process" is the performance of a described function in a computer using computer hardware (such as a processor, domain-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "process" we do not necessarily require a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
    receiving, by a computing system, data generated based on spoken user responses to prompts generated by the computing system that are associated with a dialogue, the data comprising a portion corresponding to one or more of the spoken user responses spoken before a subsequently spoken response of the spoken user responses;
    generating, by at least one processor of the computing system, a list of natural language understanding (NLU)-ranked semantic interpretations for the subsequently spoken response;
    determining, by the at least one processor and based on the portion corresponding to the one or more of the spoken user responses spoken before the subsequently spoken response, a plurality of key-value pairs corresponding to different possible resolutions for an unresolved anaphora in the subsequently spoken response; and
    selecting, by the at least one processor, from amongst the plurality of key-value pairs, and based on a context of the dialogue determined from the one or more of the spoken user responses spoken before the subsequently spoken response, a key-value pair corresponding to a semantic interpretation in the list that resolves the unresolved anaphora in the subsequently spoken response.

2. The method of claim 1, comprising determining, by the at least one processor, that the key-value pair corresponds to the semantic interpretation in the list that resolves the unresolved anaphora based on a determination that the key-value pair comprises: a context type corresponding to the context of the dialogue; and a context value indicating that the semantic interpretation is context based.

3. The method of claim 1, wherein determining the plurality of key-value pairs comprises determining, for each element of a plurality of elements of the list, a key-value pair comprising a context type and a context value.

4. The method of claim 3, wherein determining the key-value pair comprises determining at least one of a state of the dialogue, an expectation of the dialogue, a focus of the dialogue, or a selection based on the one or more of the spoken user responses.

5. The method of claim 3, comprising determining, by the at least one processor and for each key-value pair of the plurality of key-value pairs, a confidence score indicating a level of confidence that a possible resolution of the different possible resolutions corresponding to the key-value pair resolves the unresolved anaphora.

6. The method of claim 5, comprising re-ranking, by the at least one processor, for each key-value pair of the plurality of key-value pairs, and based on its confidence score, an element of the plurality of elements corresponding to the key-value pair within the list.

7. A system comprising:
at least one processor; and
a memory comprising instructions that when executed by the at least one processor cause the system to:
receive data generated based on spoken user responses to prompts generated by the system that are associated with a dialogue, the data comprising a portion corresponding to one or more of the spoken user responses spoken before a subsequently spoken response of the spoken user responses;
generate a list of natural language understanding (NLU)-ranked semantic interpretations for the subsequently spoken response;
determine, based on the portion corresponding to the one or more of the spoken user responses spoken before the subsequently spoken response, a plurality of key-value pairs corresponding to different possible resolutions for an unresolved anaphora in the subsequently spoken response; and
select, from amongst the plurality of key-value pairs and based on a context of the dialogue determined from the one or more of the spoken user responses spoken before the subsequently spoken response, a key-value pair corresponding to a semantic interpretation in the list that resolves the unresolved anaphora in the subsequently spoken response.

8. The system of claim 7, wherein the instructions, when executed by the at least one processor, cause the system to determine that the key-value pair corresponds to the semantic interpretation in the list that resolves the unresolved anaphora based on a determination that the key-value pair comprises: a context type corresponding to the context of the dialogue; and a context value indicating that the semantic interpretation is context based.

9. The system of claim 7, wherein the instructions, when executed by the at least one processor, cause the system to determine, for each element of a plurality of elements of the list, a key-value pair comprising a context type and a context value.

10. The system of claim 9, wherein the instructions, when executed by the at least one processor, cause the system to determine the key-value pair based on at least one of a state of the dialogue, an expectation of the dialogue, a focus of the dialogue, or a selection based on the one or more of the spoken user responses.

11. The system of claim 9, wherein the instructions, when executed by the at least one processor, cause the system to determine, for each key-value pair of the plurality of key-value pairs, a confidence score indicating a level of confidence that a possible resolution of the different possible resolutions corresponding to the key-value pair resolves the unresolved anaphora.

12. The system of claim 11, wherein the instructions, when executed by the at least one processor, cause the system to re-rank, for each key-value pair of the plurality of key-value pairs and based on its confidence score, an element of the plurality of elements corresponding to the key-value pair within the list.

13. One or more non-transitory computer-readable media comprising instructions that when executed by at least one processor of a computing system cause the computing system to:
receive data generated based on spoken user responses to prompts generated by the computing system that are associated with a dialogue, the data comprising a portion corresponding to one or more of the spoken user responses spoken before a subsequently spoken response of the spoken user responses;
generate a list of natural language understanding (NLU)-ranked semantic interpretations for the subsequently spoken response;
determine, based on the portion corresponding to the one or more of the spoken user responses spoken before the subsequently spoken response, a plurality of key-value pairs corresponding to different possible resolutions for an unresolved anaphora in the subsequently spoken response; and
select, from amongst the plurality of key-value pairs and based on a context of the dialogue determined from the one or more of the spoken user responses spoken before the subsequently spoken response, a key-value pair corresponding to a semantic interpretation in the list that resolves the unresolved anaphora in the subsequently spoken response.

14. The one or more non-transitory computer-readable media of claim 13, wherein the instructions, when executed by the at least one processor, cause the computing system to determine that the key-value pair corresponds to the semantic interpretation in the list that resolves the unresolved anaphora based on a determination that the key-value pair comprises: a context type corresponding to the context of the dialogue; and a context value indicating that the semantic interpretation is context based.

15. The one or more non-transitory computer-readable media of claim 13, wherein the instructions, when executed by the at least one processor, cause the computing system to determine, for each element of a plurality of elements of the list, a key-value pair comprising a context type and a context value.

16. The one or more non-transitory computer-readable media of claim 15, wherein the instructions, when executed by the at least one processor, cause the computing system to determine the key-value pair based on at least one of a state of the dialogue, an expectation of the dialogue, a focus of the dialogue, or a selection based on the one or more of the spoken user responses.

17. The one or more non-transitory computer-readable media of claim 15, wherein the instructions, when executed by the at least one processor, cause the computing system to, for each key-value pair of the plurality of key-value pairs:
  determine a confidence score indicating a level of confidence that a possible resolution of the different possible resolutions corresponding to the key-value pair resolves the unresolved anaphora; and
  re-rank, based on the confidence score, an element of the plurality of elements corresponding to the key-value pair within the list.

18. The method of claim 1, comprising determining, by the at least one processor, that the key-value pair corresponds to the semantic interpretation in the list that resolves the unresolved anaphora based on relative similarity of the semantic interpretations determined by the at least one processor.

19. The system of claim 7, wherein the instructions, when executed by the at least one processor, cause the system to determine that the key-value pair corresponds to the semantic interpretation in the list that resolves the unresolved anaphora based on relative similarity of the semantic interpretations determined by the at least one processor.

20. The one or more non-transitory computer-readable media of claim 13, wherein the instructions, when executed by the at least one processor, cause the computing system to determine that the key-value pair corresponds to the semantic interpretation in the list that resolves the unresolved anaphora based on relative similarity of the semantic interpretations determined by the at least one processor.

\* \* \* \* \*